United States Patent [19]

Leppanen et al.

[11] Patent Number: 4,833,941
[45] Date of Patent: May 30, 1989

[54] AIR MOTOR HARMONIC DRIVE SLICE LIP AUTOMATION DEVICE

[75] Inventors: Seppo I. Leppanen, Vancouver; V. Erik Kumpa; Richard S. McDiarmid, both of North Vancouver, all of Canada

[73] Assignee: Devron-Hercules Inc., North Vancouver, Canada

[21] Appl. No.: 3,509

[22] Filed: Jan. 15, 1987

[30] Foreign Application Priority Data

Jan. 24, 1986 [CA] Canada .................... 500316

[51] Int. Cl.⁴ .............. F16H 1/22; F16H 37/06; F16H 25/20
[52] U.S. Cl. .................... 74/625; 74/89.15; 74/640
[58] Field of Search ............. 74/640, 625, 89.15

[56] References Cited

U.S. PATENT DOCUMENTS

| | | | |
|---|---|---|---|
| 3,117,468 | 1/1964 | Musser | 74/640 |
| 3,128,641 | 4/1964 | Musser | 74/640 |
| 3,308,684 | 3/1967 | Wilkinson et al. | 74/626 |
| 4,078,454 | 3/1978 | Murakami et al. | 74/640 |
| 4,237,751 | 12/1980 | Davis | 74/640 |
| 4,435,992 | 3/1984 | Berthold | 74/89.15 |
| 4,509,904 | 4/1985 | MacAskill et al. | 74/640 |
| 4,517,055 | 5/1985 | Dove | 403/328 |

FOREIGN PATENT DOCUMENTS 882735 11/1981 U.S.S.R. ...................... 74/640

OTHER PUBLICATIONS

Published International Application, WO84/02405, Carlnas, Published Jun. 21, 1984.

Primary Examiner—Allan D. Herrmann
Attorney, Agent, or Firm—Christie, Parker & Hale

[57] ABSTRACT

A compact system for converting a rotational movement, of relatively low torque, into an accurate linear movement, of relatively high force. The system includes a low torque actuator and a backlash-free gear reducer. A linearly movable shaft, capable of exerting a high linear force in either direction, has a long axis in direct line with the long axis of the actuator. A direct linkage, essentially free of backlash, connects the actuator to the shaft through the gear reducer. A body and housing enclose the system.

14 Claims, 2 Drawing Sheets

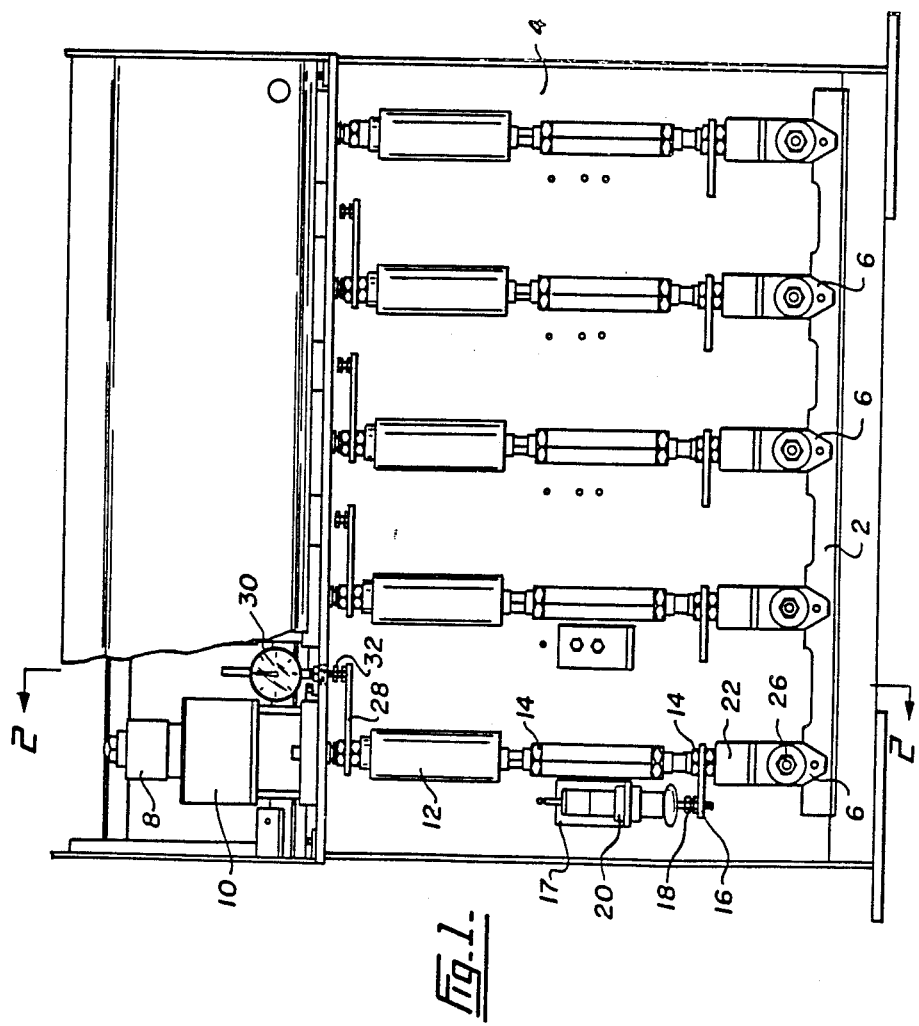
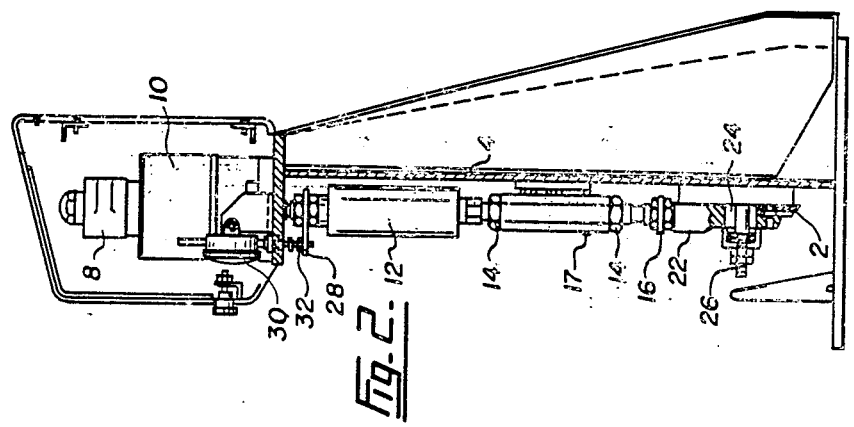

AIR MOTOR HARMONIC DRIVE SLICE LIP AUTOMATION DEVICE

FIELD OF THE INVENTION

This invention relates to a compact, backlashfree system for converting a rotational movement, of relatively low torque, into an accurate linear movement, of relatively high force. Where necessary such a force can be used to control a process or product parameter, which is dependent on a particular position of a control element requiring a high linear force for its positioning. In one of the embodiments of this invention, a rotational, relatively low torque actuator is used, whose axis is in direct line with a linearly moving shaft, uniquely geared to the actuator and connected to a control element, whose movement (when controlling the parameter) requires a relatively high linear force. The unique gear is a harmonic drive gear reducer.

In particular, this invention relates to an apparatus for controlling the size of an opening through which material is metered. This invention, for example, relates to an application in which the process parameter to be controlled is the flow rate or the size of the opening of individual transverse sections (and eventually the overall flow rate profile) of a fiber suspension emanating from the slice of a pulp or paper machine. In this application, the control element is a short section of the slice lip which, in certain cases, requires a linear force of several thousands of pounds to move. The present invention makes it possible to accurately move such a slice lip with a low torque actuator such as a high speed air motor. The product parameter profile corresponding to the above process parameter would be the overall transverse basis weight profile of the paper web.

Other parameters include such process parameter as pressure, position (per se), force, etc., as well, as many product parameters which are themselves influenced or controlled by these process parameters. Other applications include material flows from extrusion dies, application of coating colours and the like.

DESCRIPTION OF THE PRIOR ART

Components and connectors between the actuator and the control element in prior art control systems, especially those manually operated and requiring a large output force to move the control element, are often large and bulky because of the elaborate gear system required. This is not a very desirable feature in this present age of miniaturization. It also means that the control is not very accurate because of the backlash and deflection present in the prior art gears and connectors. These gears and connectors are often no in direct alignment with the rod or shaft connected to the control element, and this further increases the inaccuracy.

SUMMARY OF THE INVENTION

Applicant has found a type of gear that would be suitable. The gear that was found was an harmonic drive gear reducer, having a large turndown ratio and no backlash. It appears that to-date the harmonic gear had been restricted in use to turndown (or turnup) ratios involving going from a high speed to a low speed (or vice versa) or from a low torque to a high torque (or vice versa) and that little or nothing was known on how it could be used for effecting linear movement.

It is therefore a main objective of this invention to provide a compact system for converting a rotational movement, of relatively low torque, into an accurate linear movement, of relatively high force, which comprises:
 a low torque actuator;
 a backlash-free gear reducer;
 a linearly movable shaft, capable of exerting a high linear force in either direction, and whose long axis is in direct line with the long axis of the actuator;
 a direct linkage, essentially free of backlash, connecting the actuator to the shaft through the gear reducer;
 a body and housing enclosing the system.

A particular object is to provide such a system wherein the reducer is an in-line harmonic drive gear.

A further main object of this invention is to provide an accurate, compact, backlash-free system for controlling a desired parameter, which uses an actuator, having a rotational, relatively low torque input, connected to a shaft which in turn is connected to a control element that, when moved, requires a relatively large linear output force from the shaft, whose long axis is in direct line with the long axis of the actuator, which comprises: the actuator; a direct linkage, essentially free of backlash, between the actuator and the control element, which linkage includes an in-line harmonic drive gear reducer; a body and housing enclosing the system.

The actuator can be an air, a hydraulic or an electric motor. While a hydraulic motor will require a special supply of pressurized fluid (e.g. a mixture of synthetic oil and water in the ratio of 20:80), it is probably the smallest actuator available and the most reliable. The first two actuators too, can be more safely used in highly damp or wet conditions, such as occur around pulp or paper machines. The air motor tends to deliver a lower torque than the electric motor, so for a high linear force, more than one wave generator may be required. Where the reliability of the system is important, the air motor may require a high air quality. An electric motor can deliver a higher torque. Thus, depending on the application, each actuator has its advantages and disadvantages.

Prior art control systems, with their attendant backlash, could be tolerated, because when automated, they were often controlled by a sensor which measured a parameter of the product itself, for example, the basis weight of the paper web. Consequently, the actuator would continue to move the control element (e.g. the slice lip) until the sensor told it to stop, thereby ignoring the slackness in the system. However, since the control often involved the deformation of the control element (e.g. the above slice lip), such a system could seriously damage a very expensive control element by overstressing it. This problem might be alleviated somewhat by sensing the position of the control element itself, thereby keeping it within safe range. Since at any given moment the degree of slackness/backlash could not be predetermined, this quantity could not be preprogrammed in order to avoid completely this problem of overstressing. In addition, one still could not obtain proper control of the process or of the quality of the product.

It is to be noted that since the present invention contains essentially no backlash the above damage can now be avoided by selecting the position of the control element as the parameter to be controlled when on either the manual or automatic mode. That is, one is now able to pre-program the amount the control element is allowed to move without damaging the control element and if the amount is not enough for the desired change in the parameter, then the adjacent parts of the control element can be adjusted to accommodate the further required deformation. In such an embodiment, applicant provides the required feedback means, which would allow for calculation of the control element position once the relationship between the control element and the product change is known. In such cases, applicant's preferred means and method is a LVDT (linear voltage displacement transformer) positioned as close as possible to the control element so that the control element can be monitored at all times. Most prior art position indicators were located very near the actuator, where the accuracy would be very poor depending on the slackness in the system.

However, notwithstanding such an approach, it is still very desirable that the system be flexible enough so that any desired parameter can be chosen with which to control the required process or the quality of the product, especially, when the process is to be operated by closed-loop control.

It is therefore a further main object of this invention to provide a compact, closed-loop system for controlling any desired parameter, which system converts a rotational movement, of relatively low torque, into an accurate linear movement, of relatively high force, and which comprises:

a low torque actuator;

a backlash-free gear reducer;

a linearly movable shaft, capable of exerting a high linear force in either direction, and whose long axis is in direct line with the long axis of the actuator;

a direct linkage, essentially free of backlash, connecting the actuator to the shaft through the gear reducer;

means to connect the shaft to a control element which when moved, controls the desired parameter;

a sensor to measure the desired parameter;

a feedback and control means to and for said actuator, associated with and responsive to said sensors;

a body and housing enclosing the system.

And, it is a further object to provide a fail-safe feature for the above control system and thereby allow for a wider and safer choice of the control parameter, whereby said linkage in the system includes a device to protect the control element from damage due to excessive force on the control element. Such a device may comprise either or both a force limiter and a clutch.

It is still a further object to provide further protection and improvement for the above control system whereby said linkage includes a thrust plate and spline to separate axial forces and torques and transfer thrust loads from said shaft to said housing. In such an embodiment and in the absence of backlash, one can then locate the above LVDT near said thrust plate for easier servicing and more compactness.

It is also to be noted that in many systems, a relatively large linear force is required to move a control element a very short distance, e.g., thousandths of an inch. From a control viewpoint, it is best to control such a movement with a relatively low torque, and in particular one which involves an actuator which is either full on or full off.

Thus a further aspect of the present invention is the arrangement involving a direct drive for the actuator which remains full on while the position of the control element is not in the desired position until the difference between actual and the desired element position is within a predetermined range at which time the actuator is switched fully off.

Other aspects and objects will be evident when the invention is described in greater detail below.

As mentioned above the invention finds particular application as a slice lip control system for controlling the slice lip of a paper machine at the head box.

In a paper making machine a fiber suspension is passed from a head box to a wire section. The suspension passed onto the wire through the slice nozzle of the head box, that nozzle generally consisting of two lips. Normally one lip is fixed although it may be moved in the direction of flow. The second or upper lip is normally attached to a movable front wall of the head box so that it may be moved substantially perpendicularly to the flow direction, to widen or narrow the gap formed by the lips.

It is usual to provide the movable lip with means to control the thickness of the jet across the width of the lip. This is normally done by locally deforming the flexible lip at points at approximately 4 to 12 inch intervals across the width of the slice.

Typically the deformation is achieved by several rods attached at one end to the flexible lip and connected to a fixed object. The effective length of the rod, and thus the deflection of the corresponding part of the slice lip, is changed by a variety of systems including a variety of actuators. The actuator is the means by which the actual force is applied that increases or decreases the effective length of the rod.

Automating the slice lip of a paper machine head box is now much practiced. A number of systems have been marketed each using a different concept for the actuator. There are now thus large numbers of actuators that may be used to cause movement of the slice lip and many of these actuators are appropriate for automated control. However for a proper assessment of automated control it is important that the complete system, from the actuator to the slice lip attachment, be considered.

An important component of the automated slice lip is the actuator. Previous actuators include electric motors with worm gear drives, thermal expansion rods or thermal hydraulic systems as produced by Devron-Hercules and described, for example, in U.S. Pat. No. 4,692,213 issued Sept. 8, 1987.

In automating the slice lip attention must be given to the accuracy of the positioning. The air motor with harmonic gear drive can be designed to provide extremely accurate positioning with the actuator itself. Because the harmonic drive has a very large turndown ratio—a ratio of 17,600 to 1 can easily be obtained—the actuator may be driven by a high speed air motor operating at, for example, 2000 to 3000 revolutions per minute resulting in a programmable slew rate of 14 to 21 mils. per minute and positioning of the actuator to within 0.0001 inches. However in this regard it must be emphasized the positioning of the slice lip is only as accurate as the sum total of the accuracies of all the components in the system.

Effective slice control requires the connections and components between the actuator and the slice lip to be secure with no looseness or backlash. Many such connections are presently known but, as most installations of automated slice systems are retrofits, and since most of the slice lip connections designed to not lend themselves to modification, a slice lip connection is usually treated with separate consideration. In most cases in the prior art this connection is only slightly upgraded and the electronic positioning feedback device typically used on automated lip control systems is mounted above the connection.

It is also imperative in an automative slice lip system that there should not be inaccuracies due to the condition of the slice lip itself. Existing slice lips have usually been over-stressed at some time during their lives as the prior systems have, in the main, been manual systems in which it is relatively easy to apply excessive force to the lip and thus cause permanent deformation of the lip. The formed lip cannot deform in a predictable manner and will thus tend to degrade the performance of any computer control system.

DRAWINGS

Aspects of the invention are illustrated, merely by way of example, in the accompanying drawings in which:

FIG. 1 is a front view of a slice lip automation system according to the present invention;

FIG. 2 is a view along the line 2—2 in FIG. 1; and

DESCRIPTION OF THE PREFERRED EMBODIMENTS

Figure 3:
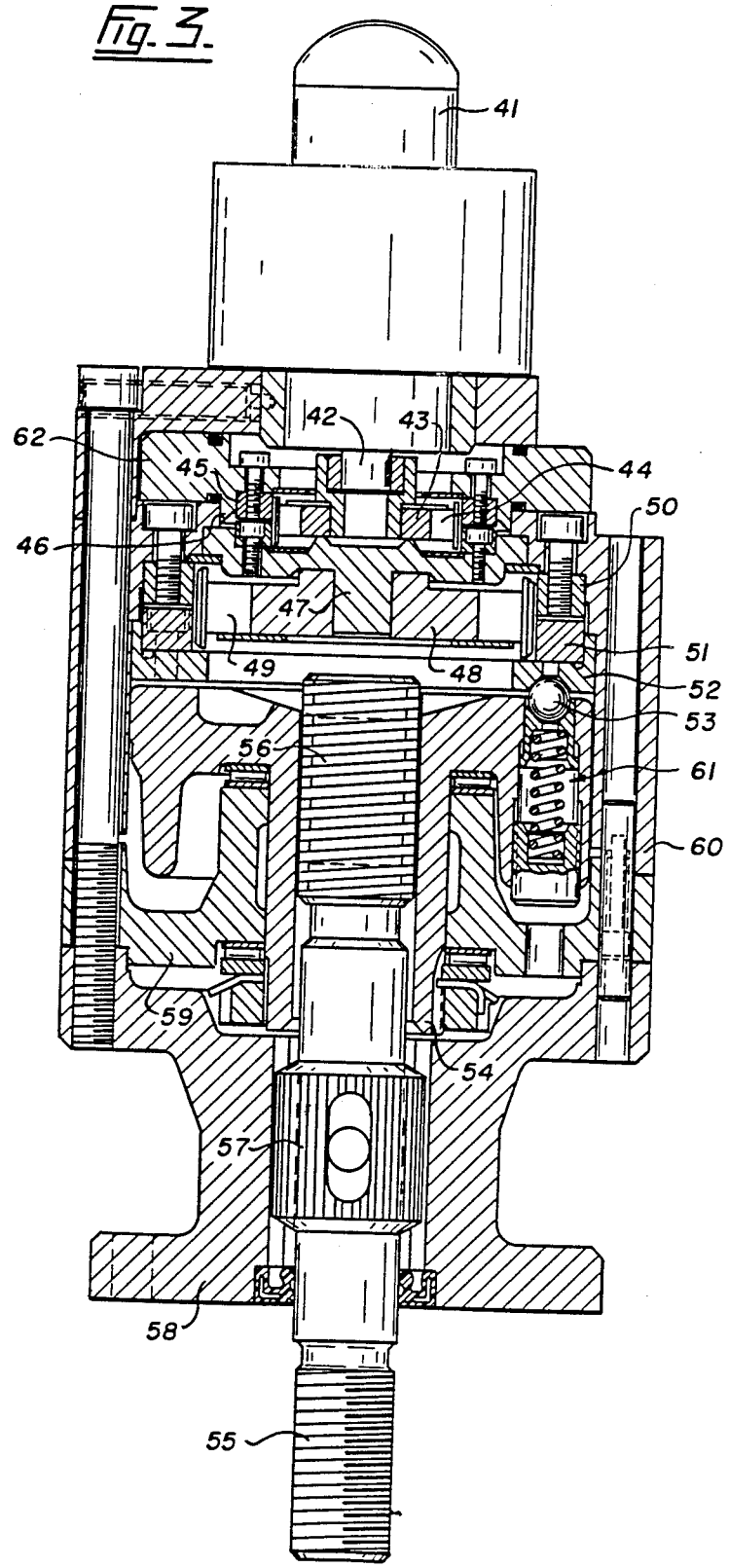
FIG. 3 is a sectional view of a harmonic gear control system which can be used in the present invention.

The drawings show a slice lip automation system for the slice lip 2 of a paper making machine, a wall 4 of the machine is shown. At six inch intervals, or some similar, conventional interval, a control system is attached to the slice lip at 6. The control system shown comprises five actuators, and associated links to the slice lip but, it will be appreciated, that the illustration is merely by way of example. Furthermore in FIG. 1 only the actuator system on the extreme left is shown completely for clarity. In the other links certain details have been omitted. However it should be emphasized that the actuator and associated links are the same in each of the five cases.

The system comprises an actuator 8 in the form of an air or electric motor attached to a harmonic drive 10. The actuator is to effect vertical movement of the link, and thus of the slice lip. The link comprises a force limiter 12 of known type, for example the type described and claimed in U.S. Pat. No. 4,651,981 issued Mar. 24, 1987. Such a limiter restricts the force applied to the lip to avoid distortion of lip. The force limiter is attached to the link by double-threaded connections 14 used to ensure that the strain on the thread eliminates looseness or backlash in the linkage. The linkage has a first bracket 16 extending from it. Mounted to the wall 4 and in contact with the linkage at 18 is a feedback to indicate the position of the lip. A conventional linear voltage displacement transformer (LVDT) 20 is shown. The LVDT 20 contacts the bracket 16 and is mounted on a bracket 17 attached to the wall 4 of the head box.

The link is attached to the lip by a special connection. The connection comprises a main member 22 formed with an opening 24 through which bolt 26 extends. This lip attachment is described and claimed in U.S. Pat. No. 4,517,055 issued May 14, 1985.

The apparatus is provided with a second or upper bracket 28, extending from the link to contact gauge 30 at 32 whereby the vertical displacement of the upper portion of the link can be detected.

FIG. 3 is a sectional view of a harmonic gear control system, which can be used with this invention. Actuator 41 is attached to the first stage harmonic drive wave generator 43, by actuator shaft 42. The first stage ave generator 43, allows a continuous elliptical deflection wave to be induced in the non-rigid external flexspline gear 44 thereby providing a continuous rolling mesh with a static, rigid, internal, circular spline gear 45, which has two more teeth than the flexspline gear 44. This arrangement causes the flexspline gear 44 to rotate in a direction opposite to that of the actuator shaft 42 at a reduction speed ratio equal to the number of teeth on the flexspline gear 44 divided by two. Since flexspline 44 also engages a dynamic, internal, spline gear 46, this dynamic gear will rotate at the same speed and direction as the flexspline 44.

Coupler 47 connects first stage dynamic spline 46 to second stage wave generator 48 which drives second stage flexspline 49, which in turn engages second stage static spline 50 and second stage dynamic spline 51, which is connected to drive plate 52. Plate 52 drives rotor 54 through its contact with ball 53, and as such, serves as a coupling device or clutch, which in some applications is optional.

As rotor 54 rotates, it forces shaft 55 to move linearly by virtue of the acme threaded section 56 at the top of shaft 55 and of spline 57, which through its engagement with thrust plate 58, prevents shaft 55 from rotating. Spline 57 also allows the various reactive forces induced it shaft 55 to be transmitted to the body and housing sections 59 and 60, thereby creating additional safety.

Force limiter 61 serves as an additional, optional safety device to prevent damage to the control element. Further details on the limiter are given below. In its present application, the Belleville washers or the coil or conical springs control the pre-determined kickoff force pressing against ball 53. If the drive plate force exceeds that kickoff force, the clutch (ball 53) slips. In FIGS. 1 and 2, it served to protect a particular control element, called the slice lip. By placing it within the body of drive system, the overall system becomes more compact.

A further optional device is a manual adjust disc 62 which by-passes the actuator shaft 42 operating directly on the circular spline gear 45 of the first harmonic drive, thereby allowing one to adjust manually the linear movement/position of shaft 55, should there be a power failure, etc.

In applications where a high linear force is to be exerted it should be noted that the stresses (and distortions) in the overall system act as a spring, so that any potential slackness, that might arise from the use of the acme threaded section 16, is absorbed by this "spring" effect.

In applications where the linear force is at a lower level, other known threaded/screw sections can be used e.g. those involving a special worm gear action, to further minimize any slackness/backlash.

Thus, FIG. 3 illustrates an overall compact control system which allows a rotational, relatively low torque input to be used for the precise positioning of a linearly movable shaft capable of exerting a high linear force in either direction.

As mentioned above, a further application of the present invention is in the metering of material through a die, such as when a plastic film or web is formed by the exertion of plastic material through an extrusion die. The forces required to deform the control element, i.e. the die lip, can even be greater than those required to deform the above paper machine slice lip. Since the details of such an application are so similar to that of the above slice, further description is unnecessary.

Similarly, another application to which the present invention can be applied, is that for the coating of various films or webs with coating colours. In the case of roll coaters, transverse segments of the lip of a doctor blade can be deformed by the corresponding shaft connectors and so control the amount of coating colour that is applied to the web.

In the case of a coater called an air-doctor or air-knife, an orifice similar to that for the paper machine slice could be used, and the size of the opening in the various transverse segments could be varied/controlled; this would increase or decrease the velocity of the air jet and so vary the thickness of the coating film.

Applications where the present invention can be used solely to exert/create a high linear force are, of course, very numerous, and very obvious, and need not be listed here. The most obvious one being that of a power jack for lifting very heavy objects. In such an application the thrust plate described in FIG. 3, would be anchored or supported so that it would in effect receive the weight of the object to be lifted.

The system of the present invention operates by the LVDT assessing the downward movement of the bracket 16 and thus of the lip 2. What movement is required is assessed by computer, downstream of the lip and examining the characteristics of the sheet. If it is determined that the sheet has areas of local thickness or thinness then an appropriate signal is sent to the air motor, acting through the harmonic drive to raise or lower the link, and thus the lip, to correct the local deficiency and the lip is raised or lowered locally, by the operation of one actuator to correct the deficiency. The system of the present invention uses a direct feedback control logic through the LVDT. The actuator is driven through to an error between the feedback position, as fed by the LVDT, and the requested set point position. When the controller detects the feedback position is equal to the requested position, within a defined dead band, then the controller turns off the drive. This control approach is made possible by the design of the slew rate of the actuator. Simplified control approach is considered to be a great improvement over conventional PID loop time pulse encountered pulse system.

Thus the present invention provides a simple yet extremely sensitive means of controlling the slice lip on a paper making machine head box.

It will be understood that the above-described embodiment are for the purpose of ilustration only and change and modification may be made thereto without departing from the spirit and scope of the invention.

We claim:

1. A compact system for converting a rotational movement of relatively low torque into an accurate linear movement of relatively high force which comprises:
    a low torque actuator having a longitudinal axis;
    a two-stage backlash-free harmonic drive gear reducer having first harmonic gear means driven by said actuator driving second harmonic gear means to drive a linearly movable shaft capable of exerting a high linear force in either direction, and whose long axis is in direct line with the longitudinal axis of the actuator, the component gears of each of said first and second harmonic gear means having gear teeth in continuous engagement;
    a direct linkage, essentially free of backlash, connecting said second harmonic gear means to said shaft;
    means to manually adjust the position of said linearly movable shaft comprising a manually rotatable wheel that acts to rotate said first harmonic gear means independently of actuator to move said shaft; and
    a body and housing enclosing the system.

2. A system as claimed in claim 1 where the actuator is an air motor.

3. A system as claimed in claim 1 where the actuator is a hydraulic motor.

4. A system as claimed in claim 1 where the actuator is an electric motor.

5. A system as claimed in claim 1 where said linkage connecting said second harmonic gear means to said shaft includes a thrust plate and spline to separate axial forces and torques and transfer thrust loads from said shaft to said body and housing.

6. A system as claimed in claim 1 where the actuator is fully on and fully off.

7. A compact system for controlling any desired parameter, which system converts a rotational movement of relatively low torque into an accurate linear movement of relatively high force which comprises:
    a low torque actuator having a longitudinal axis;
    a two-stage backlash-free harmonic drive gear reducer having first harmonic gear means driven by said actuator driving second harmonic gear means to drive a linearly movable shaft capable of exerting a high linear force in either direction, and whose long axis is in direct line with the longitudinal axis of the actuator, the component gears of each of said first and second harmonic gear means having gear teeth in continuous engagement;
    a direct linkage, essentially free of backlash, connecting said second harmonic gear means to said shaft;
    means to manually adjust the position of said linearly movable shaft comprising a manually rotatable wheel that acts to rotate said first harmonic gear means independently of said actuator to move said shaft;
    means to connect the shaft to a control element which when moved controls the desired parameter;
    a body and housing enclosing the system.

8. A system as defined in claim 7 where said linkage connecting said second harmonic gear means to said shaft includes a device to protect the control element from damage due to excess force on said shaft.

9. A system as claimed in claim 8 where the device is a force limiter.

10. A system as claimed in claim 8 where the device is a clutch.

11. A system as claimed in claim 7 where said control element is a transverse section of a slice lip and said parameter is the flow rate.

12. A compact, closed-loop system for controlling any desired parameter, which system converts a rotational movement of relatively low torque into an accurate linear movement of relatively high force which comprises:
    a low torque actuator having a longitudinal axis;
    a two-stage backlash-free harmonic drive gear reducer having first harmonic gear means driven by said actuator driving second harmonic gear means to drive a linearly movable shaft capable of exerting a high linear force in either direction, and whose long axis is in direct line with the longitudinal axis of the actuator, the component gears of each of said first and second harmonic gear means having gear teeth in continuous engagement;

a direct linkage, essentially free of backlash, connecting said second harmonic gear means to said shaft;

means to manually adjust the position of said linearly movable shaft comprising a manually rotatable wheel that acts to rotate said first harmonic gear means independently of said actuator to move said shaft;

means to connect the shaft to a control element which when moved controls the desired parameter;

a sensor to measure the desired parameter;

a feedback and control means to and for said actuator, associated with and responsive to said sensor;

a body and housing enclosing the system.

13. A system as claimed in claim 12 where said feedback means is a LVDT located very close to the control member.

14. A system as claimed in claim 12 where said feedback means is a LVDT located very close to the thrust plate.

* * * * *